Nov. 24, 1964  F. P. WILLIAMS  3,157,934
CORE MEMBER

Filed April 28, 1961  2 Sheets-Sheet 1

INVENTOR.
FREDERICK P. WILLIAMS
BY
William R. Jacox
ATTORNEY

Nov. 24, 1964 F. P. WILLIAMS 3,157,934
CORE MEMBER
Filed April 28, 1961 2 Sheets-Sheet 2
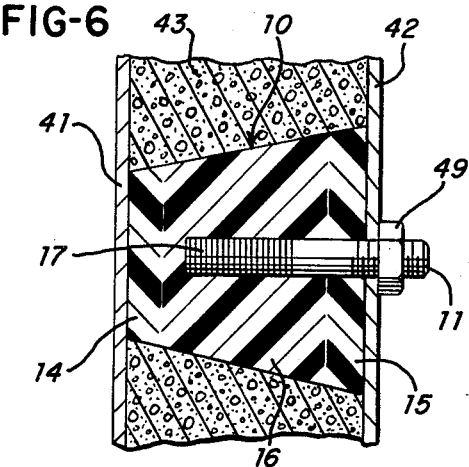
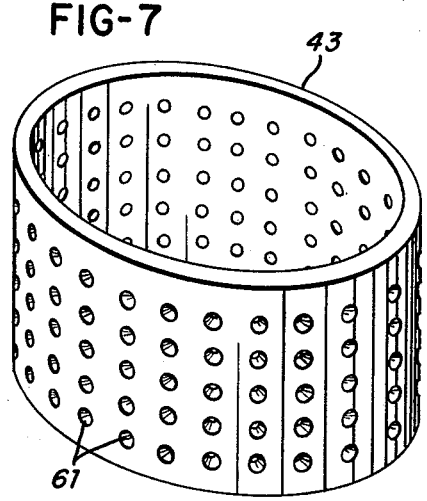
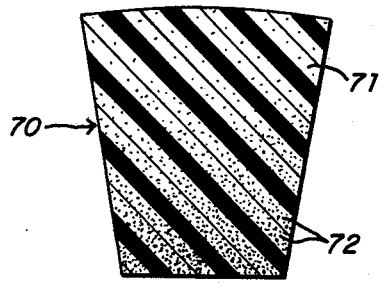
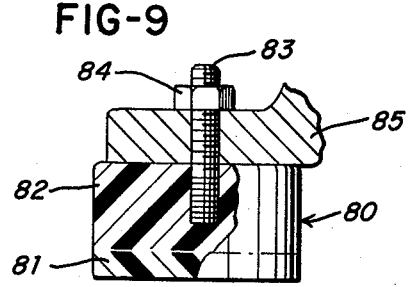
INVENTOR.
FREDERICK P. WILLIAMS
BY
William R. Jacox
ATTORNEY

United States Patent Office 3,157,934
Patented Nov. 24, 1964

3,157,934
CORE MEMBER
Frederick P. Williams, 713 N. Euclid Ave.,
Dayton 7, Ohio
Filed Apr. 28, 1961, Ser. No. 106,404
3 Claims. (Cl. 25—128)

The present invention relates to an article of manufacture for use in the industrial arts. More specifically, the present invention relates to a flexible-rigid member having sealing and supporting properties making it especially suited for use in supporting applications such as vibration-dampening motor mounts, in sealing or closure units in fluid-control valves, as a core or precise cavity forming unit in the art of concrete molding or the like.

The prior art has often encountered the need for a flexible-rigid assemblage wherein the rigid element is desired for support or to provide a firm foundation for anchoring or fastening the assemblage and the flexible portion or portions are desired for vibration-dampening, sealing or the like. In the valve art, for example, it has been necessary to have closure members which, on the one hand, may be sufficiently firm and rigid to withstand the load of the fluid pressures and to hold the member securely within the valve and, on the other hand, may be sufficiently flexible; i.e., deformable and resilient to conform to a mating surface such as might surround an orifice or channel opening, to effectively close and seal the same. Similarly, in the art of vibration-dampening motor mounts, it is necessary to have a rigid construction to support the weight of the motor and, at the same time, a resilient component capable of absorbing the vibratory motions.

The area of the prior art wherein the improvements of the present invention are of perhaps even greater significance, however, is in the art of molding such as the molding of walls or annular members of concrete wherein openings through the wall are desired. In the manufacture of leaching tank or leaching well bodies, for example, it is often desired that the tank wall be characterized by a plurality of openings therethrough. In the conventional practice, two opposed molding faces, such as spaced shells arranged concentrically or in parallel, have been held in spaced relationship to receive the concrete therebetween and to hold the concrete until it becomes set in the desired configuration. To provide the openings through the wall of the molded product, rigid core members spanning the space between the opposed molding surfaces have been fastened to one of the shells so that upon the removal of the unit to which the cores are attached, the cores will be withdrawn from the set concrete, leaving the desired openings. Because of the weight and impact of the concrete, the cores have had to be of a strong and rigid construction so that they will not yield or bend within themselves and will remain in fixed position relative to the molding surfaces during the molding process.

This necessary rigidity of the cores, however, has involved several inherent disadvantages, chief among which has been the inability of the rigid cores to conform precisely to the molding surfaces, particularly where the surface is other than completely planar. Thus, where it has been desired to form a cylindrical or elliptical tank, the ends of a rigid core would span rather than conform to the arcuate molding surfaces. This would occur both on the mold shell to which the core was attached and on the opposed molding shell against which the end of the core was to be held. Such departures naturally result in the flow of concrete around the ends of the core tending to obscure the opening upon the surfaces of the finished product. In addition to the obvious detriment to the completeness of the cavity formation, this "flashing" of the concrete around the openings has made it difficult if not impossible to remove the core-bearing mold member after the concrete has become set for the reason that the flashing acts as an abutment flange or key. When it is considered that in a leaching well or dry well or the like there may be upwards of fifty such core members associated with any cavity defining plate, it can be seen that the force of all of these keys would make the removal of the member impossible without serious damage to the product or form.

In attempts to overcome the above disadvantages the prior artisans have sought to so control the configuration of the core members at those surfaces which will contact the opposed molding areas that there will be no departure of the core from the molding surface. This, of course, has been extremely expensive not only from the standpoint of the formation of the cores in the first instance, but also from the fact that a particular core could then be used for only one molded product. Even where the necessary time and expense have been incurred to achieve the desired contact between the core and the mold surfaces, however, it has not been possible to make a cavity defining wall of any great area where a curvilinear product is being made for the reason that the perpendicularly projecting cores about any substantial arcuate surface will tend to converge toward the center of the product and wedge themselves against removal after the concrete has become set. In an attempt to overcome this problem several plates have been employed in end to end relation to form the entire mold wall. This, of course, has involved additional time and expense as well as introducing additional joints between the mold plates, requiring additional sealing and/or presenting additional opportunities for irregularities in the surface of the finished product.

It is accordingly an object of the present invention to provide an improved article of manufacture for use in the industrial arts.

It is a further object of the present invention to provide a flexible-rigid unit of integrated construction suitable for use in supporting, sealing, and vibration-dampening applications and the like.

It is another object of this invention to provide such an article of manufacture which has electrical insulating qualities.

It is a more specific object of the present invention to provide an improved core unit for use in the molding of concrete articles, particularly of annular shape having arcuate broadside surfaces.

Still another object of the present invention is to provide such a core which may be employed in relatively large numbers in association with a single arcuate mold plate without interfering with the removal of the plate from the finished product.

Still another object of the present invention is to provide such a core which will produce a smooth and uniform cavity throughout the thickness of the concrete product not only at the openings of the cavities upon the surfaces of the product, but throughout the entire surface of the cavity.

To achieve these and other objects and advantages which will be apparent from a reading of the following disclosure, this invention contemplates a flexible-rigid member comprising a medial portion of relatively hard and rigid characteristics and one or more integrated boundary portions of relatively flexible and resilient characteristics. The rigid portion is such that it will provide a load carrying capacity and means for a permanent association of the device with the assemblage in which it is to be used. The flexible portions, on the other hand, are such as to provide resilient deformability for effecting seals in engagement with irregular surfaces, vibration-dampening absorption, or the like.

The product articles of the present invention are composed of polymeric materials generally referred to as plastics; i.e., materials that contain as an essential ingredient an organic substance of large molecular weight, are solid in their finished state and, at some stage in their manufacture or in their processing into finished articles can be shaped by flow. More particularly, the articles of the present invention are composed of high-molecular-weight plastics of the thermosetting variety. The polyvinyl chlorides, epoxies, and polyesters have been found particularly suited, as will be hereinafter explained.

In the method hereinafter described the polyvinyl chlorides, may be employed as organosols or as plastisols subject to curing under heat and/or pressure and the like, but preferably monolythycally as will be hereinafter described. The polyesters and epoxies are cured under the influence of a catalyst. The rigid and the flexible portions of the article are preferably composed of the same or substantially the same plastic material and are integrally formed, each with the other, so that in the finished product there is no appreciable visible distinction or demarcation between those portions which are rigid and those which are flexible.

In the case of motor mounts or vibration-dampeners, it is usually necessary only that the article in the form of a conventional foot-like support have one rigid portion and a flexible layer at one end thereof. The rigid portion is then associated directly with the base or frame of the motor to be mounted, whereas the flexible portion contacts the supporting surface, isolating the same from the vibrations of the motor. Similarly, where the article of the present invention is employed as a closure member for fluid valves, the mounting portion of the article at which it is to be permanently associated with the valve may be of the rigid construction and only the sealing portions or surfaces may have flexible characteristics.

Where, on the other hand, the device is to be employed as a core member for forming a cavity between the inner and outer walls of a curved shell, wherein the core spans and contacts both of the opposed surfaces of the cavity, the central or medial portion of the article is of rigid construction and both of the ends are flexible. In this case, the means for mounting or fastening the core to the mold may conveniently pass through one of the flexible portions and be seated in the rigid portion. In this or in any construction wherein fastening means such as a threaded stud or bolt passes through the flexible portion and threadably or otherwise engages the rigid portion, the flexible portion provides the additional beneficial effect of sealing the entrance of the fastening means into the article.

In the manufacture of articles according to this invention, it is preferred that the same or a similar plastic material be used throughout the construction. However, it is further preferred that the composition be so compounded with varying degrees of accelerators, catalysts, fugitive solvents or the like within the skill of the plastic compounder that the materials which form both the flexible and rigid portions of the article be simultaneously treated in the manufacture and will achieve their ultimately desired properties at substantially the same time.

Thus, in molding a core member having a terminal flexible portion, an intermediate rigid portion and a second terminal flexible portion, the cavity in which the article is molded first receives a layer of the plastic material which is so compounded that, under a predetermined exposure to curing conditions of heat and/or pressure, such material finally assumes the desired degrees of flexibility, deformability, resiliency and the like. On top of such a layer is positioned an intermediate layer which is of smilar material, but which is compounded differently to the extent that, once this material is subjected to the same curing conditions, the intermediate layer will be firm, rigid, undeformable, etc. On top of this intermediate layer of material in the mold may then be placed a third layer of the material. This third layer is so compounded that under the stated curing conditions, it will become flexible.

The resiliency or rigidity characteristics of each layer may be determined by the amounts of filler material or by the ratio between the amounts of plasticizers and resins. Increased amounts of filler material cause increased rigidity in that portion of the finished product. More resin in a given quantity of material causes greater rigidity in that portion of the cured object. Furthermore, the type of resin used has an affect upon the rigidity of that portion of the finished article. A greater amount of plasticizer in a given amount of material results in greater resiliency in that layer or portion of material as a finished product. Also, of course, different plasticizers and resins may provide different degrees of resiliency or rigidity.

The mold cavity thus filled is then subjected to the stated curing conditions under the influence of which the respective flexible and rigid portions of the article become integrally formed and the differing final physical properties obtained monolithically; i.e., in a consistent and synchronized progression toward the ultimately desired physical properties for each of the respective portions with the passage of time so that, once the curing operation is completed, the finished article will be an integrated whole having the desired variations in degrees of hardness, deformability, resiliency, etc.

The invention thus generally described may be more clearly understood by reference to the following detailed description of certain preferred embodiments thereof in connection with which reference may be had to the appended drawings.

In the drawings:

FIGURE 6 is an enlarged sectional view taken substantially on line 6—6 of FIGURE 5.

FIGURE 7 is a perspective view of a shell made according to the method shown in FIGURE 5.

FIGURE 8 is a sectional view of a modification in an article of manufacture made according to this invention.

FIGURE 9 is a sectional view of an article of manufacture according to the present invention employed as a vibration-dampening motor mount.

Figure 1:
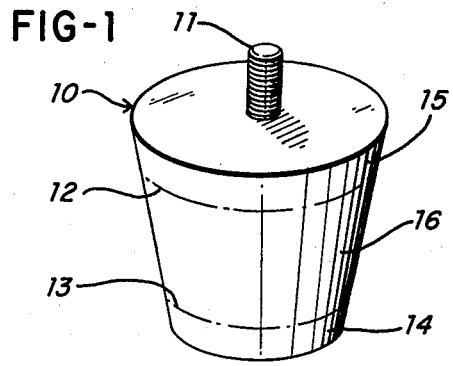
FIGURE 1 is a perspective view of an article according to the present invention suitable as an element of a fluid valve body or as a molding core.
Figure 2:
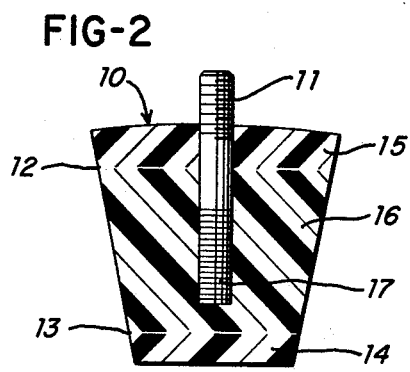
FIGURE 2 is a sectional view of the article of FIGURE 1.

Referring now to FIGURES 1 and 2, the article designated generally by the number 10 is shown in outward appearance to be in the form of a truncated cone. Mounting means in the form of a threaded stud 11 extends from the upper portion thereof. As indicated by broken lines or spaces 12 and 13 in FIGURES 1 and 2, the conical member 10 is divided into three portions comprising a lower terminal portion 14, an upper terminal portion 15 and an intermediate or medial portion 16. It is to be understood that the lines are spaces shown as 12 and 13 in FIGURES 1 and 2 are not necessarily visible lines, but are only for the purposes of description.

In accordance with the teachings of this invention, one or both of the terminal portions 14 and 15 are of a relatively flexible, resilient and deformable nature, whereas the medial portion 16 is hard, rigid and inflexible. One of the uses and advantages of rigidity in the intermediate rigid portion 16 is illustrated in FIGURE 2, wherein it is shown that a portion 17 of the stud 11 is embedded and firmly held within the rigid portion 16. The portion 17 of this rod or stud 11 may be threaded or knurled, if desired, to reinforce its locked engagement with the rigid material of the portion 16.

Figure 3:
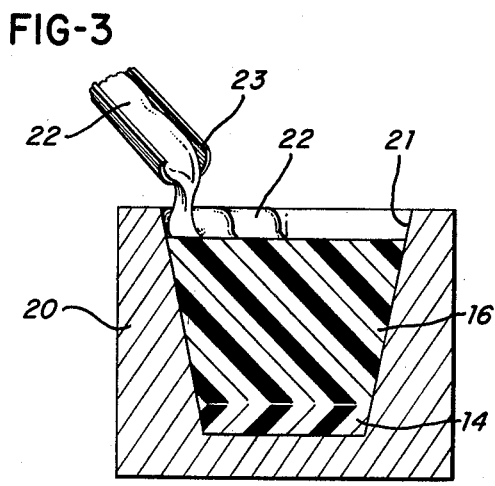
FIGURE 3 is a diagrammatic type of view, showing in section, a mold cavity member suitable for forming an article according to the present invention and illustrating a preliminary stage in the process of manufacture.
Figure 4:
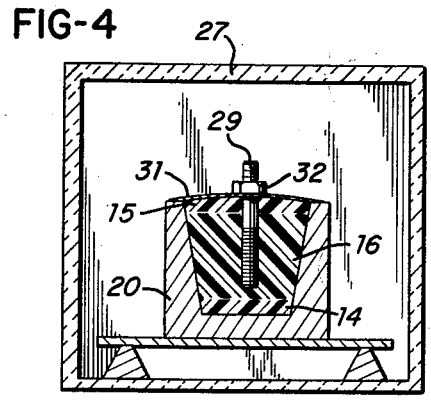
FIGURE 4 is a sectional view, drawn on a smaller scale, of the mold cavity member of FIGURE 3 placed in a curing oven during a later stage in the process of manufacture according to this invention.

In the manufacture of an article as illustrated in FIGURES 1 and 2, a suitable mold member 20, shown in FIGURES 3 and 4, having a cavity 21 in the shape of that ultimately desired in the finished article may be employed. Where, according to the present invention, the material of which the article is to be formed is a plastic in a liquid state prior to being heat cured, such material may be poured into the mold from a spout or trough 23. First, of course, the material comprising the lower terminal portion 14 is poured into the cavity 21 until it reaches the desired thickness. Then the material to form the medial portion 16 is introduced in such a manner as not to mix with the material of the lower layer. Finally, a material 22 to form the upper terminal portion 15 is poured into the mold cavity 21.

It has been found that by properly compounding the plastic, the viscosity of the materials to constitute the respective portions may be so controlled that upon careful pouring, particularly from a position adjacent the upper edge of the mold cavity 21, the liquid materials will in fact remain separate and apart and will in effect float one upon the other. The pouring is preferably carried out by beginning around the perimeter of the cavity and working spirally inwardly toward its center.

After the cavity 21 is filled and the layer 22 is completed, the mold member 20 is placed in a hot air oven, herein referred to by numeral 27, for exposure to curing conditions, such as elevated temperatures for a given time. It will be understood that if the particular material is of the type that requires both heat and pressure to effect its cure, the oven 27 may be in the form of an autoclave, filled for example with live steam. Moreover, as stated above, the material of which the article is formed may be of such a nature and so compounded that it may be cured either upon standing a sufficient length of time at ambient conditions of temperature and pressure or may achieve its solid or semi-solid properties upon the evaporation of a solvent with the passage of time.

Where, as in most cases, it is desired that some mounting or attachment means be associated with the article, this may be conveniently accomplished in the present invention by placing a stud 29 in the mold cavity, in the manner shown in FIGURE 4. The stud 29 has an upper threaded end which extends through a support plate 31 and has a nut 32 attached thereto. The desired extending position of the stud 29 may thus be determined by the position of the nut 32 upon the stud 29.

Depending upon the particular nature of the plastic material being treated in the mold member 20, it is usually not necessary that any particular seal be effected between the support plate 31 and the mold cavity 21. However, where the material in the cavity 21 is such that it is subject to nominal expansion upon the application of heat during the curing process, the plate 31, under the influence of its own weight and the weight of the stud 29 suspended therefrom by the nut 32, may act as an upper limit upon the expansion of the plastic material and may thereby control the contour of the upper surface of the finished product formed in the mold member 20.

As stated above, the material for the respective portions 14, 15, and 16, shown in FIGURES 1, 2, and 3, may be so compounded by varying the degrees of catalytic materials, the amount of volatility of the solvents, etc. that while these materials are subjected to the same degree of heat and/or pressure for the same length of time, their respective progressions toward a complete cure to a rigid substance will be at different rates. Hence, the article remains in the curing oven until all the portions thereof achieve the desired states of hardness and rigidity. As a result of the previous compounding of the materials, the portion 16 becomes hard and rigid while the portions 14 and 15 achieve varying degrees of flexibility at a level previously determined by the compounding.

Once the article is thus completed insofar as its cure is concerned, the cover plate is removed by simply removing the nut 32. Because at this point, the lower end of the stud 29 is firmly embedded in and held by the rigid medial portion 16, the stud 29 itself may be used as a means for lifting or pulling the finished product from the mold cavity.

In the production of some articles of manufacture, materials having different rates of curing may be used in a given object. For example, the first material poured into a container may have a greater curing time than a material poured somewhat later into the container and before the curing time of the first material has elapsed.

Figure 5:
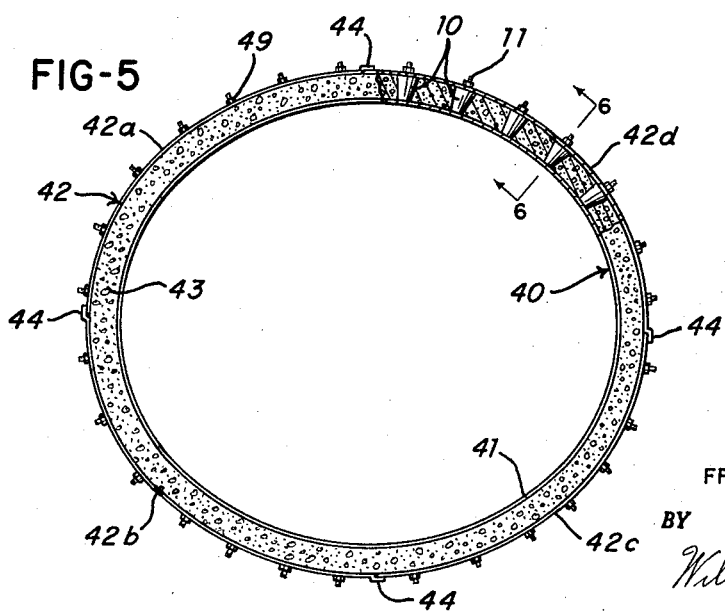
FIGURE 5 is a plan view, on a greatly reduced scale, with parts broken away and shown in section, of a filled mold or form structure using core members of this invention, the core members causing holes to be formed in the finished wall made in the form structure.

FIGURES 5, 6, and 7 illustrate one of the most advantageous uses of an article of this invention made as shown in FIGURES 1, 2, 3, and 4. Shown in FIGURE 5 is a mold or form member generally designated by the reference numeral 40. The mold or form 40 is used in the formation of an annular concrete shell 43. It will be observed that this particuar mold member 40 comprises an inner forming plate or wall 41 which is a unitary annular piece having the arcuate form desired.

Uniformly spaced radially outwardly from the inner plate 41 is an outer plate or wall 42 which, in the preferred embodiment here shown, comprises the outer shell plate sections 42a, 42b, 42c and 42d which are joined as by the lap joints 44 through which suitable fastening means (not shown) are employed to hold the sections of the outer plate 42 together against the weight of the concrete. It will be observed that the inner plate 41 and the outer plate 42 are concentrically arranged so that the space between them is an annular cavity of substantially uniform dimensions. The cavity receives concrete in the form of an annular wall or shell.

Assisting in establishing and preserving the desired spacing between the inner plate 41 and the outer plate 42 and serving as cores to provide cavities in the finished molded product are the articles or cores described above as with respect to FIGURES 1, 2, 3, and 4. As best shown in FIGURE 6, the threaded mounting stud 11 extends through the outer plate 42 and an article 10 is held tightly against the plate by a fastening nut 49 which is threadedly attached to the stud 11. As stated above, the rigid intermediate portion 16 which comprises the greater part of the core 10 provides a firm attachment for the stud 11 to the core 10. At the same time, however, the flexible portions 14 and 15, being in engagement with the plates 41 and 42 yield to conform to any curvatures or surface irregularities in the plates 41 and 42 to effect a complete seal and prevent any wet concrete 43 from flowing between the core 10 and the plates 41 and 42. It should also be observed that the flexible portion 15 surrounding the stud 11 serves as a further seal to prevent any flow of wet concrete between the mounting stud itself and the core 10, and prevents any leakage of wet concrete through the opening in the plate 42 through which the stud 11 extends.

In the formation of the concrete shell 43 illustrated in FIGURE 7, a plurality of the cores 10 are attached to the sections 42a, 42b, 42c, and 42d of the outer plate member 42. The plates 42a, 42b, 42c, and 42d are then joined as shown in FIGURE 5, surrounding and spaced from the inner plate 41. It is understood, of course, that the length of the cores 10 is such that, when the outer plates 42 are joined, the cores 10 will themselves establish the concentric alignment between the inner plate 41 and the outer plater 42. The cores 10 are, in fact, urged by at least a nominal force against the inner plate 41. At this point then the resilient portions 14 and 15 are in forced contact with the plates 41 and 42 to effect the desired sealing between the core member 10 and the cavity defining walls or plates 41 and 42. The concrete 43 is then poured between the plates 41 and 42 and flows around the core members 10 and allowed to become permanently set. After the concrete has achieved substantially its final structural form, the sections of the outer plate 42 are removed, followed by removal of the plate 41.

Examination of FIGURE 5 discloses that the cores 10, attached to any one of the sections of the outer plate 42, are generally convergent toward the center of the annular form 40 and this angular disposition of the cores 10 tends to lock the plate 42 in the concrete. It is in this regard, however, that an additional advantageous feature of the cores 10 of this invention arises. The flexibility of the terminal portions 14 and 15 of these cores allows them to be slightly changed as they are removed from the concrete 43 with removal of the outer plate 42. Thus, the cores 10 are readily removed from the concrete 43 after it has set.

The finished shell product thus stripped of the plates 41 and 42 is shown in FIGURE 7 to be an annular concrete shell of a generally elliptical shape through which are a plurality of openings or apertures 61. Because of the sealing effect between the cores 10 and the mold plates 41 and 42, during the forming of the structure 43 of FIGURE 7, the openings of the apertures 61 upon both the inner and outer surfaces of the shell are completely smooth, regular, unbroken and free of any "flash" as is commonly encountered in the molding arts.

A modification of an article according to the present invention and a modification in the method of manufacture thereof is represented in FIGURE 8 wherein the article 70 is composed of a plastic material or matrix 71 throughout, there being no variations generally in the matrix composition. Within this article 70, however, and embedded in the matrix 71 are a plurality of minute particles 72 which may be considered as a filler and may consist of ceramic beads, metallic pellets, sand or the like. These particles 72 are more densely concentrated in the lower terminal portion of the article 70 and, being hard and rigid, cause the lower portion of the article 70 to be relatively rigid and non-deformable as compared to the more flexible upper portion.

As in the case of the articles of this invention described in connection with FIGURES 1 through 6 above, the rigid lower portion of the article 70 may be employed as an anchor for mounting means associated with the article whereas the more flexible upper portion may be used for sealing and conforming to other configurations. Thus, when it is desired to use the article 70 of FIGURE 8 in a mold, for example, wherein only one of the mold surfaces has any irregularity in shape, the article of core 70 is attached to one of the cavity defining plates with a stud entering the more rigid lower portion, while the flexible end portion engages an opposite surface.

In the manufacture of an article 70 as illustrated in FIGURE 8, the plastic matrix 71 is first compounded according to generally accepted plastic compounding practices and a predetermined amount of the discrete particles 72 are then thoroughly admixed therein. The mixture of the matrix 71 and the particles 72 is then poured into a mold cavity similar to that shown in FIGURES 2 and 3. At the time the material is thus introduced into the mold, the particles are thoroughly mixed and uniformly distributed throughout. However, in the passage of time, where the particles such as 72 are heavier than the plastic material, the influence of gravity causes the particles 72 to congregate at the lower portion to form a more rigid lower portion.

Similar use of the weight differential between the particles 72 and the matrix 71 to effect a change in the distribution of the particles 72 throughout the article is achieved by placing the matrix material 71 and particles 72 in a centrifuge with that portion ultimately to be the more rigid portion facing outwardly from the rotational axis.

Where the particles 72 are of a ferrous metal, a method of production is that of bringing magnetic means into proximity with that portion of the plastic material which is to be more rigid. Once the plastic has been sufficiently exposed to any one of the above influences to cause the desired variation in distribution of the particles to take place, the plastic material is then subjected to curing conditions such as the hot air oven of FIGURE 4. Thus, the particles 72 are permanently set within the plastic material 71.

FIGURE 9 shows a shock absorbent foot 80 made according to this invention. The foot 80 has an upper or main body portion 82 which is relatively rigid and a lower portion 81 which is flexible. It is observed that the foot 80 is connected to a base 85 by a threaded stud 83 which is embedded and firmly held within the rigid portion 82. A nut 84 is attached to the threaded stud 83 and secures the connection between the foot 80 and the base 85.

The foot 80 may be employed as a motor mount where the base 85 is connected with a motor. The flexible portion 81 of the foot 80 provides resiliency to the foot 80 upon the floor or other supporting surface while the rigid portion 82 serves as a means for firmly attaching the foot 80 to the base 85.

Because of the integration between the respective portions of the articles according to the present invention, there is no appreciable visible distinction between the respective portions and there are no well defined lines of demarcation separating the portions. This feature is particularly important in the case of the core elements as above described and in certain valve applications where it is most important that the article be smooth and continuous throughout. A further advantage obtained from the close integration between the respective portions of an article of this invention is that they are permanently associated and there is no tendency for the portions to divide or separate.

Articles made according to this invention may also serve as electrical insulator elements.

While the present invention has been described in considerable detail in connection with certain preferred embodiments thereof, it is to be understood that the foregoing particularization and detail have been for the purposes of illustration only and do not limit the invention as it is defined in the appended claims.

Having thus described my invention, I claim:

1. For use with structure for forming concrete, a solid truncated conical core, all of the core being composed of a continuous mass of high molecular weight plastic, the core having three axially aligned portions, the core having two base end portions which are separated by a medial portion,
   each of the base end portions being solidly and entirely of material which is relatively soft, flexible, and resilient, the medial portion being solidly and entirely of material which is relatively hard and rigid, the end portions thus being adapted to firmly seal against the form structures as the end portions engage the form structures and assume the contour of the form structures, support means secured to the medial portion, the medial portion also being adapted to withstand deflection by concrete material so that the core is readily removable from the concrete after solidification thereof.

2. For use between two concrete forming surfaces, a core having a pair of opposed end portions engageable with the concrete forming surfaces, the core also having a medial portion intermediate the two base end portions, the portions being axially aligned, the core being solid and consisting of high molecular weight plastic material throughout all portions thereof, the two end portions being adapted to engage the two concrete forming surfaces, each of the end portions being entirely of relatively soft, flexible, resilient material which is adapted to readily conform to any irregularities of the concrete forming surfaces as the base end portions firmly engage and seal against the concrete forming surfaces, the medial portion being relatively hard and rigid and adapted to withstand deformation by concrete material disposed intermediate the two concrete forming surfaces, support means secured to the medial portion.

3. For use with structure having a concrete forming surface, a core member consisting of a solid body of high molecular weight material provided with a transversely extending solid end portion consisting entirely of relatively soft, readily deformable, flexible, resilient material adapted to engage the concrete forming surface and to conform to any irregularities thereof as the end portion firmly seals against the surface, the core also having a transversely extending solid second portion which joins the end portion, the second portion being relatively rigid and hard and resistant to deformation, the second portion being spaced from said concrete forming surface, support means secured to the second portion.

References Cited in the file of this patent

UNITED STATES PATENTS

| | | |
|---|---|---|
| 408,213 | Carter | Aug. 6, 1889 |
| 763,333 | Stevens | June 21, 1904 |
| 2,593,456 | James | Apr. 22, 1952 |
| 2,596,028 | James | May 6, 1952 |
| 2,645,929 | Jones | July 21, 1953 |
| 2,694,228 | Mathis | Nov. 16, 1954 |
| 2,773,294 | Pilling | Dec. 11, 1956 |
| 2,777,185 | Wehring | Jan. 15, 1957 |
| 2,901,775 | Goff | Sept. 1, 1959 |
| 2,901,809 | Ciesla | Sept. 1, 1959 |
| 2,953,835 | Armstrong et al. | Sept. 27, 1960 |
| 2,986,797 | Aisenberg | June 6, 1961 |

FOREIGN PATENTS

| | | |
|---|---|---|
| 213,079 | Australia | July 5, 1956 |
| 866,164 | Great Britain | Apr. 26, 1961 |